Nov. 27, 1923.  1,475,733
W. S. ADAMS
BRAKE MECHANISM FOR CAR TRUCKS
Filed Dec. 22, 1922 2 Sheets-Sheet 1

Inventor
Walter S. Adams
By his Attorney

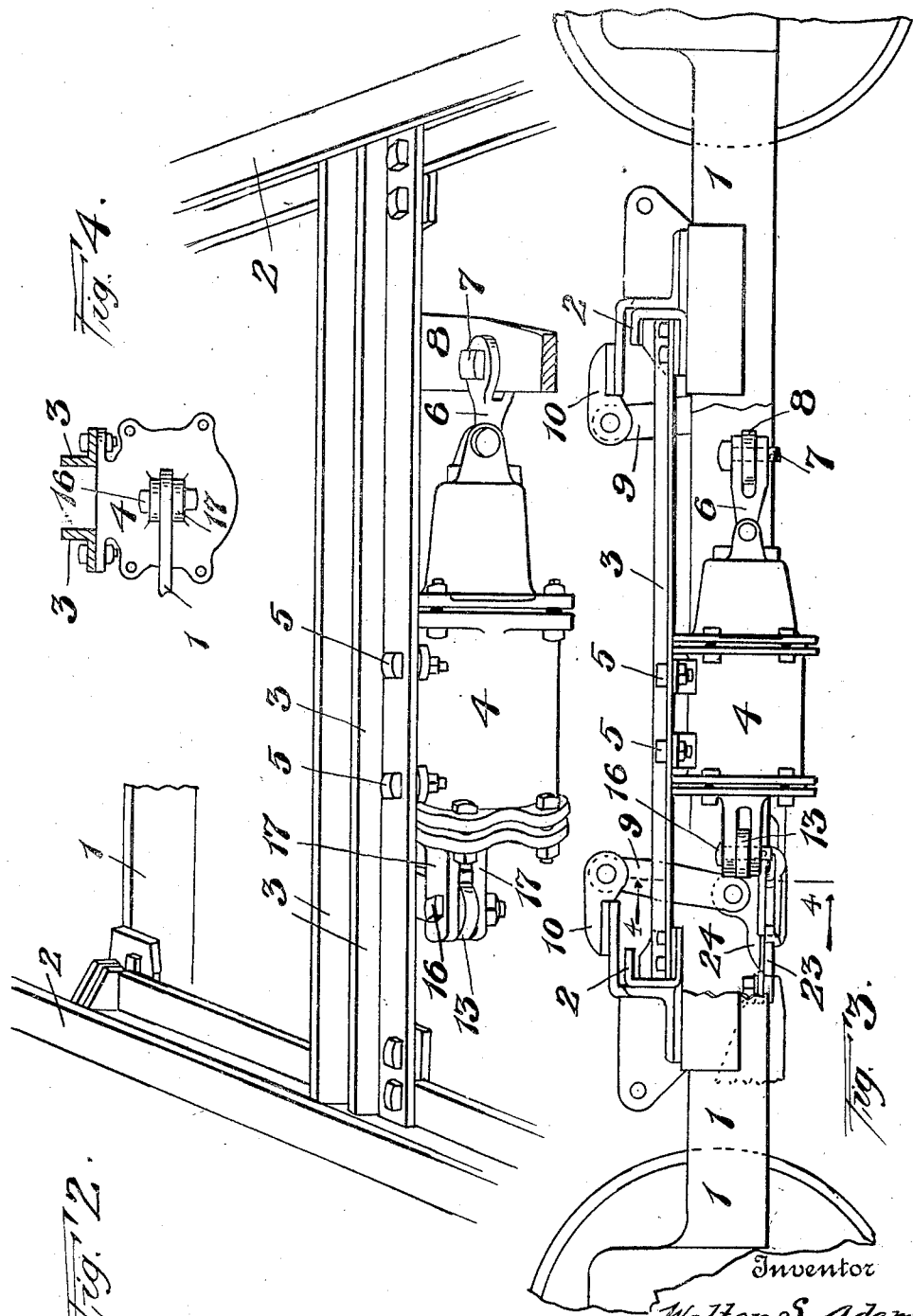

Patented Nov. 27, 1923.

1,475,733

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BRAKE MECHANISM FOR CAR TRUCKS.

Application filed December 22, 1922. Serial No. 608,419.

*To all whom it may concern:*

Be it known that I, WALTER S. ADAMS, a citizen of the United States, and a resident of the city and county of Philadelphia, State of Pennsylvania, have invented a certain new and useful Improvement in Brake Mechanism for Car Trucks, of which the following is a specification.

This invention relates to an improvement in a brake mechanism adapted to be used in connection with the trucks on railway cars and has for its object to provide a mechanism composed of comparatively few operating levers or parts and also to provide a mechanism which will be completely carried by the car truck.

In the past, the brake air-cylinder or other source of brake-actuating power has usually been carried by the car body with the result that additional levers and other mechanism had to be used to connect the air cylinder to the brake mechanism mounted on the truck.

The object of this invention therefore, is to minimize the number of parts necessary to provide the complete brake mechanism, all of which mechanism is carried by the truck and not partly by the truck and partly by the car body as has been the custom heretofore.

With these objects and other objects which may hereinafter appear, in view, I have devised the particular arrangement of parts hereinafter set forth and more particularly pointed out in the claims appended hereto.

Reference is to be had to the accompanying drawing forming a part hereof in which Figure 1 is a plan view of portions of a car truck, showing my improved brake mechanism.

Figure 2 is a perspective view of portions of the truck frame showing the manner in which the brake air-cylinder is suspended therefrom.

Figure 3 is a side elevation of portions of the truck, with parts being broken away to disclose construction, and Figure 4 is a sectional view on the line 4—4 of Figure 3 looking in the direction of the arrows.

Throughout the various views of the drawings, similar reference characters designate similar parts.

Figure 1:
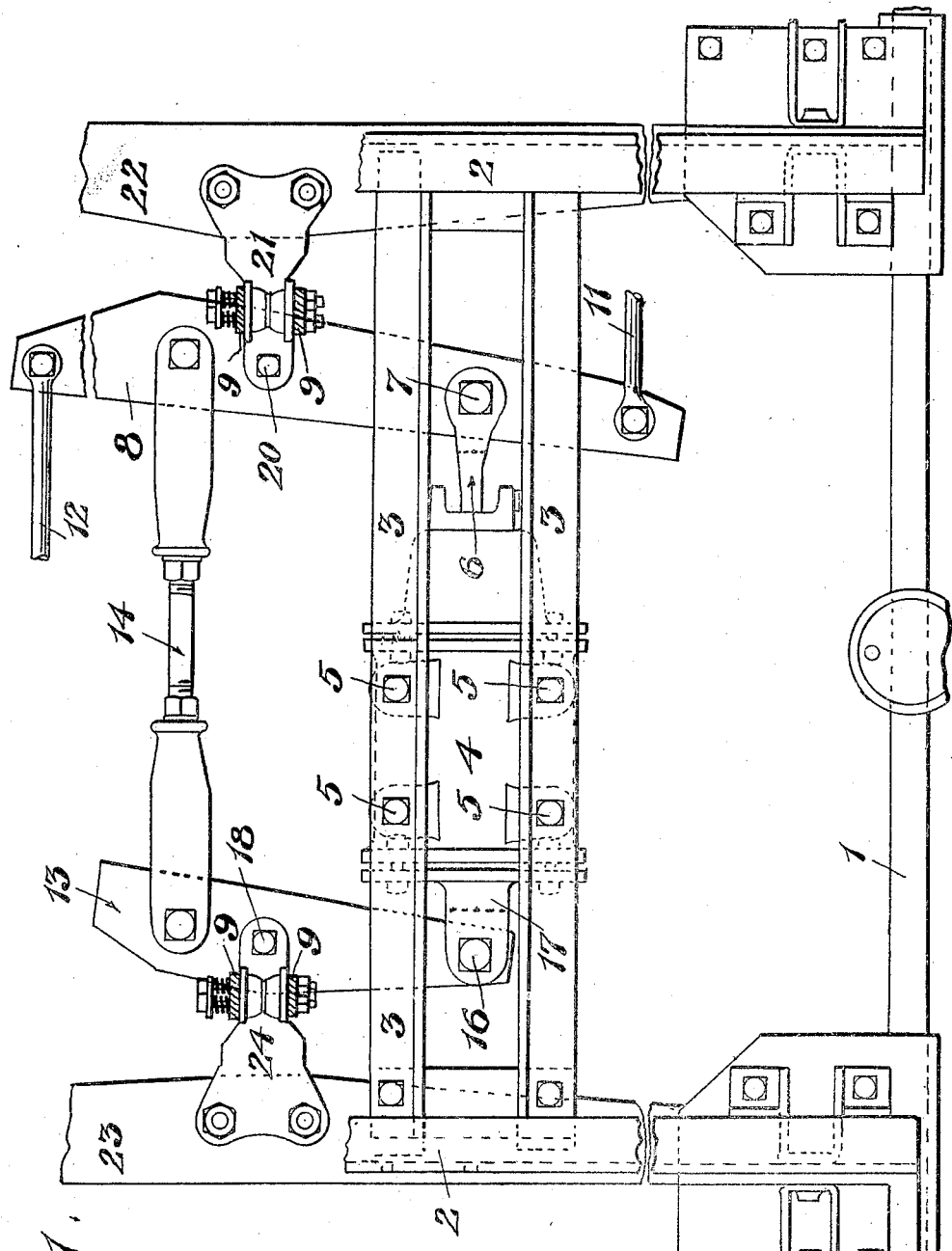

In the preferred embodiment of my invention as shown in the accompanying drawing, 1 indicates a portion of the side frame of the truck. There are two of these side frames which are connected by transverse braces 2. Extending longitudinally of the truck and connected to the braces 2 is a pair of spaced-apart braces 3 which support the brake-operating air cylinder 4 by means of the bolts 5. The air cylinder 4 is hung from these braces 3 and said cylinder has its piston rod 6 connected at 7 to a brake operating lever 8. Each of the cross braces 2 is provided with a bracket 10 from which hangers 9 depend, and the lower ends of these hangers 9 connect to a bracket 21 secured to the brake beam 22 at its center. The brake lever 8 is pivotally connected to the bracket 21 as at 20. The lever 8 has its ends connected to rods 11 and 12 to permit manual operation of the brake independent of the air cylinder 4. The lever 8 is connected to another brake lever 13 by means of an adjustable link 14.

The brake lever 13 is connected to the other brake beam 23 similarly to the lever 8. The lever 13 has its inner end pivoted at 16 to a fixed ear 17 on the end of the air cylinder opposite to the piston rod. The brake lever 13 is adapted to be connected to the bracket 24 secured to the brake beam 23 as at 18.

From the foregoing, the operation of my improved brake mechanism will be readily understood.

To apply the brake, the air cylinder piston rod 6 is caused to move out of the cylinder 4 which forces the brake lever 8 and the brake beam secured thereto to the right of Figure 1. When the brake shoes, which are secured to the brake beam 22 in the usual manner, are applied to the wheels, the lever 8 pivots about the point 20 causing the link 14 to thrust the brake lever 13 about its pivotal point 16 to cause the brake shoes secured to the brake beam 23 to be applied to their wheels.

In the construction herein shown, it will be seen that the air cylinder is placed directly between the brake levers, which lie horizontally and cause a direct application of the shoes to the wheels.

From the foregoing, it is obvious that my invention is not to be restricted to the exact embodiment shown but is broad enough to cover all structures coming within the scope of the annexed claims.

What I claim is:—

1. A mechanism of the class described comprising a truck frame, horizontal brake levers carried thereby, a brake-operating air cylinder carried by the frame and located between the ends of said levers, one of said levers being adapted to be actuated by said cylinder and the other lever being adapted to be shifted by movement of the first mentioned lever.

2. A mechanism of the class described comprising a truck frame, a pair of horizontal brake levers within said frame, brake beams secured to said levers, and a brake operating cylinder carried by the frame and located between and connected to said levers.

3. A mechanism of the class described comprising a truck frame, a pair of horizontal brake levers within said frame, a brake-operating cylinder carried by said frame and located between said levers, one of said levers adapted to be actuated by said cylinder, and a connection between said lever and the other lever.

4. A mechanism of the class described comprising a truck frame, side members therefor, a pair of spaced brace members in said frame, a pair of brake levers below said brace members, an air cylinder for operating said brake members suspended from said brace members and connected to said brake levers and brake beams connected to said brake levers.

Signed at the city and county of Philadelphia, and State of Pennsylvania, this 8th day of December, 1922.

WALTER S. ADAMS.